United States Patent [19]

Munster

[11] 3,898,660

[45] Aug. 5, 1975

[54] TIME/BANDWIDTH INTERCHANGE SYSTEM

[75] Inventor: Allen C. Munster, Santa Ana, Calif.

[73] Assignee: KMS Industries, Inc., Ann Arbor, Mich.

[22] Filed: Oct. 15, 1973

[21] Appl. No.: 406,487

[52] U.S. Cl. ......................................... 343/17.2 PC
[51] Int. Cl. .............................................. G01s 7/28
[58] Field of Search ............................. 343/17.2 PC

[56] References Cited
UNITED STATES PATENTS

| | | | |
|---|---|---|---|
| 2,800,580 | 7/1957 | Davies | 333/29 |
| 3,188,637 | 6/1965 | Mortley | 343/17.2 R |
| 3,261,969 | 7/1966 | Routh | 343/17.2 PC |
| 3,292,175 | 12/1966 | Brandon | 343/17.2 PC |
| 3,333,267 | 7/1967 | Williams | 343/17.1 |
| 3,680,105 | 7/1972 | Goldstone | 343/17.2 PC |
| 3,686,572 | 8/1972 | Guilhem et al. | 343/17.2 PC X |
| 3,720,950 | 3/1973 | Vehrs, Jr. | 343/17.2 PC |

*Primary Examiner*—Malcolm F. Hubler
*Attorney, Agent, or Firm*—Barnes, Kisselle, Raisch & Choate

[57] ABSTRACT

There is disclosed for use in a pulsed sensor system, such as radar or the like, a method and apparatus for time/bandwidth interchange in which the target response chirp pulses are first offset in frequency linearly with range; the offset response pulses are then delayed as a function of frequency; and, finally, the delayed, offset response pulses are rechirped into narrow band chirp pulses suitable for processing. There are also disclosed a number of methods and apparatuses for adapting the new time/bandwidth interchange system to various problem situations which arise in radar applications.

19 Claims, 15 Drawing Figures

TIME/BANDWIDTH INTERCHANGE SYSTEM

This invention relates to pulsed sensor systems of the type in which the frequency of the pulse to be sensed is a known function of time.

In conventional coherent chirp radar systems, the target response pulses are first subjected to pulse compression at intermediate frequency and then to phase detection to produce coherent video. The output of the phase detector is at full radiated bandwidth so that high speed analog-to-digital converters are required before the information can be processed in the digital equipment. The output of the analog-to-digital converter is a series of high speed bursts of digital data upon which digital time/bandwidth interchange may be performed for economical processing in the digital computer. The high speed A/D converter and the high speed buffer required for digital time/bandwidth interchange are two of the most costly components in the total pulsed radar system. It is, therefore, an object of the present invention to provide a time/bandwidth interchange system which will significantly reduce the cost of a radar installation by replacing the high speed A/D converter with a low speed A/D converter and eliminating the need for a high speed buffer.

It is another object of the present invention to provide a time/bandwidth interchange system which is readily adaptable to the various problem situations which arise in radar and signal intercept applications.

It is also an object of the present invention to provide an apparatus for stretching target response pulses where the radiated pulses are unusually short.

It is a further object of the present invention to provide an apparatus for offsetting the target response pulses linearly with range where the radiated pulses are unusually long.

It is a further object of the present invention to provide an apparatus for expediting time/bandwidth interchange where the radiated pulses are unusually long and/or the mapped swath is unusually large.

It is yet a further object of the present invention to provide a time/bandwidth interchange system wherein there is maximum redundancy of component parts.

In accordance with the present invention, there is provided a method and apparatus for time/bandwidth interchange in a pulsed sensor system wherein the target response chirp pulses are first converted to constant-frequency response pulses each of which are offset in frequency linearly with range. The offset response pulses are then delayed as a function of frequency such that response pulses from adjacent resolvable targets do not overlap in time. Finally, the delayed, offset response pulses are reconverted to narrow-band chirp pulses suitable for processing in conventional narrow-band processing equipment.

The invention further provides a number of methods and apparatuses for adapting the new time/bandwidth interchange system to the various problem situations which arise in the course of pulsed sensor applications. Accordingly, there is provided an apparatus for stretching target response pulses where the radiated pulses are unusually short. There is also provided an apparatus for offsetting the target response pulses linearly with range where the radiated pulses are unusually long. There is further provided several apparatuses for expediting time/bandwidth interchange where the radiated pulses are unusually long and/or the mapped swath is unusually large.

The novel features which are considered characteristic of the invention are set forth, in particular, in the appended claims. The invention itself, however, both as to its construction and its method of operation, together with additional objects, features and advantages thereof, will be best understood from the following description when read in connection with the accompanying drawings in which:

Before discussing the drawings in detail it must be understood that while the invention is described in terms of a pulsed radar system, it is equally applicable to sonar, seismic or optical sensor systems in which the target response pulses have a known frequency v. time characteristic. Similarly, it will be recognized that, while the invention is described in conjunction with digital processing equipment, and, indeed, it was originally conceived to solve problems concomitant therewith, the invention may also be practiced with analog processing equipment such as coherent optical processors or reentrant delay line processors.

In the various figures, identical reference numbers indicate identical or similar component parts. Sequentially primed numbers used in reference to certain signals in the timing diagrams indicate that the signal referenced is a derivative of the previous signal with the same base number.

Figure 1:
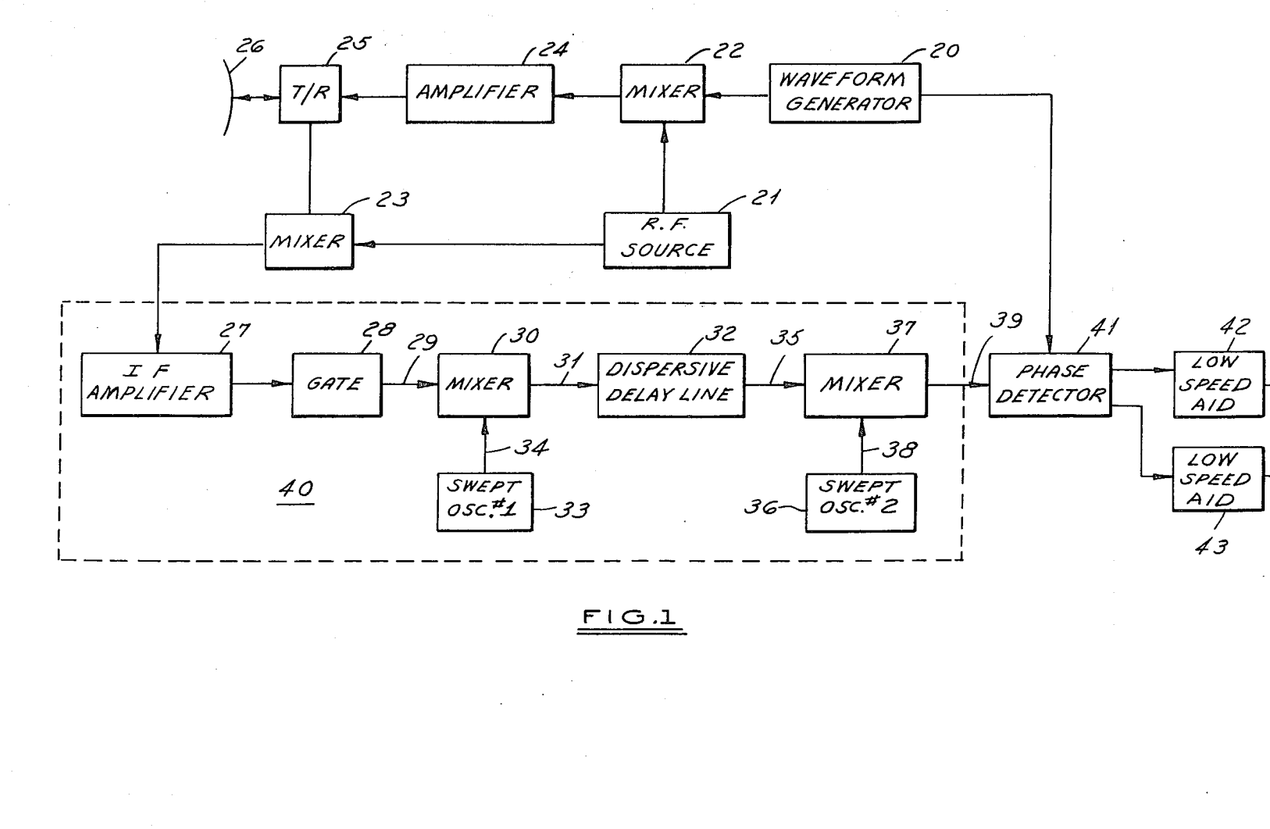
FIG. 1 is a block diagram of the antenna input/output stage of a radar installation using the time/bandwidth interchange system of the present invention.

Turning now to FIG. 1, there is depicted the antenna input/output stage of a coherent chirp radar installation using the time/bandwidth interchange system of the present invention. In the output stage, waveform generator 20 produces a linearly frequency modulated "chirp" signal of intermediate frequency having a duration equal to the duration of the transmitted pulse. This signal is mixed in mixer 22 with a carrier frequency signal provided by RF source 21 before it is sent to output amplifier 24 for appropriate amplification. The amplified signal is then fed to transmit-receive switch 25 to be radiated from antenna 26. Target response pulses are received in antenna 26 and fed to mixer 23 where the carrier frequency provided by source 21 may be altered to a frequency band more suitable for further amplification and processing. The target response chirp signals are then fed to the input stage of time/bandwidth interchange system 40.

The input stage will at least consist of IF amplifier 27 to amplify the target response signals. The input stage may also contain gate 28 to gate target response pulses to the system only during the time associated with the target swath to be mapped. Gated target response signals appear on line 29.

The target response pulses appearing on line 29 are first modulated by the output of first swept oscillator 33 in mixer 30. The output of oscillator 33 appears on line 34. The modulated target response signals are then sent to dispersive delay line 32 by way of connection 31. The delayed signals appearing on 35 are beat against the output of swept oscillator 36 in mixer 37. Oscillator 36 has its output appearing on line 38; the output of mixer 37 appears on line 39.

The signals on line 39 are fed to phase detector 41 which receives its reference from waveform generator 20 where they are processed for both in-phase and quadrature components. For coherent processing, phase detector 41 includes a dispersive delay network having a delay characteristic that decreases as a function of frequency. The response signals will then be compressed or "dechirped" in this delay line for coherent detection of the in-phase and quadrature components. These components are sent to low speed A/D converters 42 and 43 to be thereafter routed to standard digital processing equipment.

Operation of time/bandwidth interchange system 40 may best be explained with reference to FIG. 2 which contains the time-frequency histories of target response signals passing through the system. It should be noted initially that in FIG. 2 frequency is plotted against time and that signal amplitudes are not shown. Frequency is separately plotted in FIGS. 2A through 2F and the frequencies therein are not to scale. The time coordinate is common to all six figures.

Figure 2:
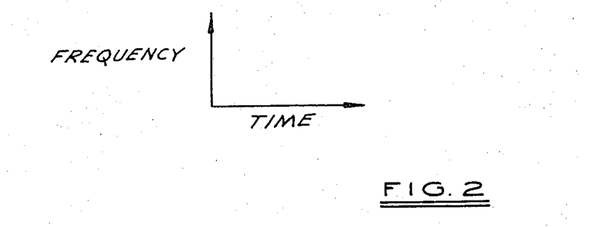
FIGS. 2A to 2F are a series of timing diagrams depicting the relationships of certain signals appearing in the system shown in FIG. 1.
Figures 2A, 2B:
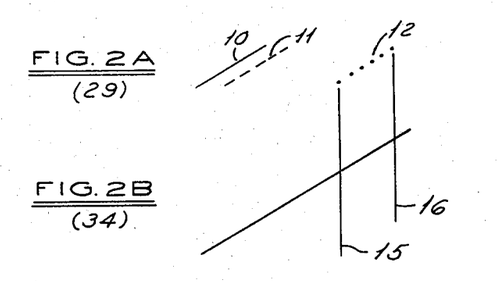

FIG. 2A depicts target returns appearing on line 29 of FIG. 1. Each target return consists of a frequency modulation ramp which begins at a time proportional to the range of the target and is of duration equal to the duration of the radiated signal. Since these response pulses are "echoes" of the transmitted pulse, it is evident that the transmitted pulse was a linearly increasing frequency ramp or "upchirp" pulse. It will be evident from the following discussion that, with minor modification, the invention is equally applicable to linearly decreasing or "downchirp" radiated pulses.

The first target response within the mapped swath is depicted by solid line 10. Dashed line 11 is a target response from a second target at the minimum resolvable range from the first target. Dotted line 12 is a target response at the end of the swath range. It should be noted here that pulses 10, 11 and 12 are responses to a single radiated pulse. In a typical mapping radar, the mapped swath must be significantly less than the time between transmitted pulses to avoid range ambiguities (second round echoes). The swath to be covered will always be less than the unambiguous range; it is, therefore, evident that the time between responses 10, 11 and 12 and the responses to the next radiated signal is the time available for the time/bandwidth interchange.

Figure 2C:
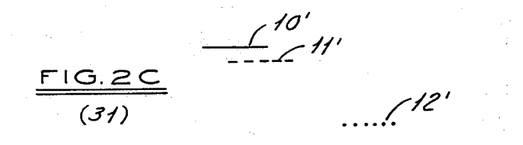
Figure 2D:
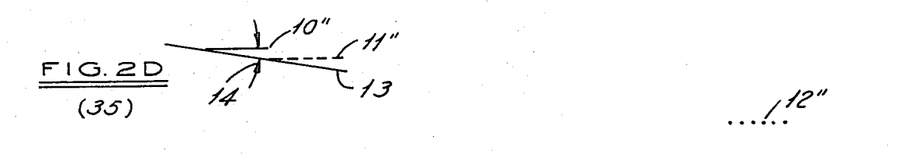
Figure 2E:
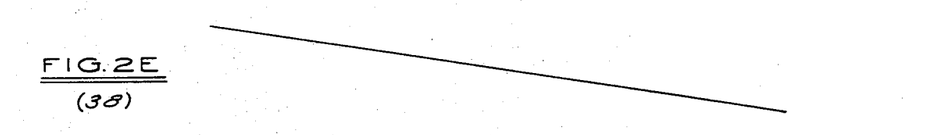

FIG. 2B depicts the output of first swept oscillator 33 which output appears on line 34. It should be noted that the slope of FIG. 2B is identical to the slope of frequency ramp response pulses 10, 11 and 12. When these two signals are mixed together in mixer 30, the resulting output on line 31, depicted in FIG. 2C, is a series of constant-frequency pulses 10', 11' and 12' now offset in frequency linearly with range. These signals are then passed through dispersive delay line 32 whose delay increases linearly with decreasing frequency. The characteristic of this delay line is chosen to delay returns from adjacent resolvable targets (10 and 11) by such an amount that the constant-frequency response signals will no longer overlap in time. Thus, it can be seen that delayed, offset, constant-frequency response pulses 10'' and 11'' no longer overlap in time at the output of dispersive line 32 depicted in FIG. 2D.

Figure 2F:
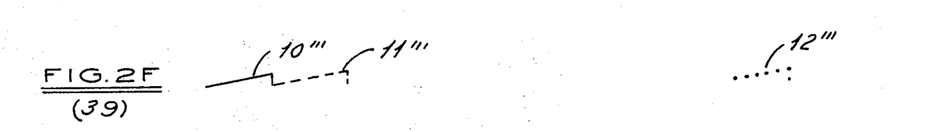

The delayed offset response pulses are still centered about the time-varying offset frequency introduced by swept oscillator 33. To provide bandwidth reduction, these signals must be mixed with the output of second swept oscillator 36 whose output appears in FIG. 2E. It will be noted that line 13 in FIG. 2D which connects the beginnings of offset response pulses 10'' and 11'' defines the linearly increasing delay introduced by dispersive delay line 32. The output of oscillator 36 depicted in FIG. 2E has a slope parallel to line 13. When the output of delay line 32 is beat against the depicted output of oscillator 36, the result will be a representation of the difference between the slopes of these two signals; this difference is indicated as a time-varying function at 14. It can be seen at 14 that the bandwidth of this time varying function is considerably less than the bandwidth of response signals 10, 11 and 12. The output of mixer 37 is depicted in FIG. 2F as narrowband chirp signals 10''', 11''' and 12''' which may now be processed in the conventional manner in phase detector 41 and the following low speed digital equipment.

Time lines 15 and 16 in FIG. 2 will be explained hereafter in relation to FIG. 8.

From the waveforms illustrated in FIGS. 2A to 2F one can deduce the requirements on the delay line (bandwidth and differential delay) imposed by selection of a radiated pulse length and mapped swath. The major contribution to bandwidth requirements comes from the difference in frequency between swept oscillator 33 and the target return at the maximum range of interest. Thus, a reduction in mapped swath will reduce the required delay line bandwidth. A reduction in the oscillator sweep range will also reduce the bandwidth needed in the delay line; but this also increases the output bandwidth which is equal to the difference in frequency between the beginning and end of a target pulse at the output of the second mixer. A reduction in the sweep rate of oscillator 33 combined with an increase in the radiated pulse length will preserve the narrow output bandwidth while reducing the delay line bandwidth. In general, the increased radiated pulse length is desirable from the standpoint of overall radar systems design in that it reduces transmitter peak power requirements while preserving the required average power. An illustrative example of the relationship of the design parameters discussed above is given at the end of this specification.

Limitations on the length of the radiated pulse may occur because of minimum range requirements or because the time/bandwidth interchange system is to be installed in an existing radar installation. Under these circumstances, waveform matching may be accomplished in the input stage of the system.

Figure 3:
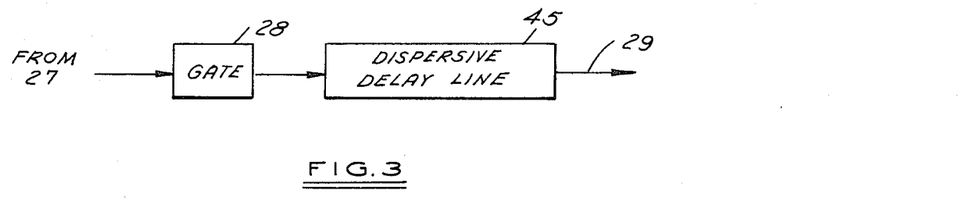
FIG. 3 is a block diagram of an optional input stage to the time/bandwidth interchange system shown in FIG. 1.
Figure 4:
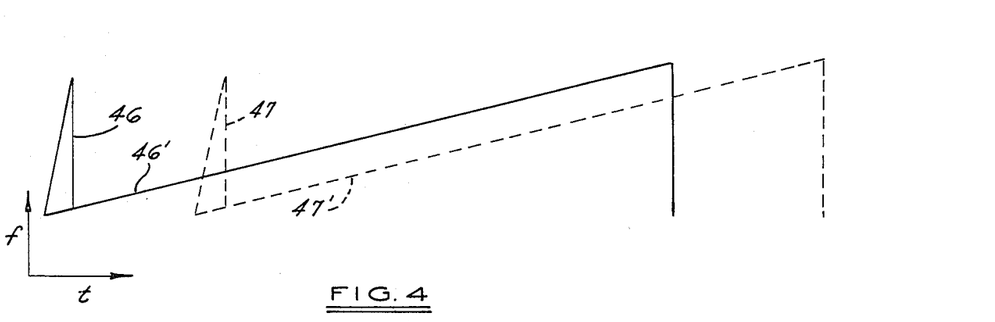
FIG. 4 is a timing diagram depicting the relationships of certain signals in the option depicted in FIG. 3.

Waveform matching may be accomplished by inserting in the input stage of the interchange system the dispersion network shown in FIG. 3 which is similar to the network which would have been used in the transmitter stage if larger radiated pulses had been permitted. In the network of FIG. 3, gate 28 enables target response pulses from amplifier 27 to be channeled to dispersive delay line 45 during the time associated with the swath to be mapped. The output of delay line 45 appears on line 29 to mixer 30. The characteristic of delay line 45 is chosen to stretch the actual target response signals into chirp signals having the time duration for which the interchange network was designed. Therefore, as depicted in FIG. 4, short and long range response pulses 46 and 47 which appear at the output of gate 28 are stretched into response pulses 46' and 47' by delay line 45.

The delay versus frequency characteristic of a surface wave delay line is determined by the spacing of the array electrodes. Thus, a large differential delay will require a long section of material which becomes difficult to manufacture and handle. Alternatively, one can employ several dispersive delay lines in series, each of which provides a part of the differential delay. Amplifiers must be inserted between the cascaded delay lines to make up for insertion losses.

Figure 5:
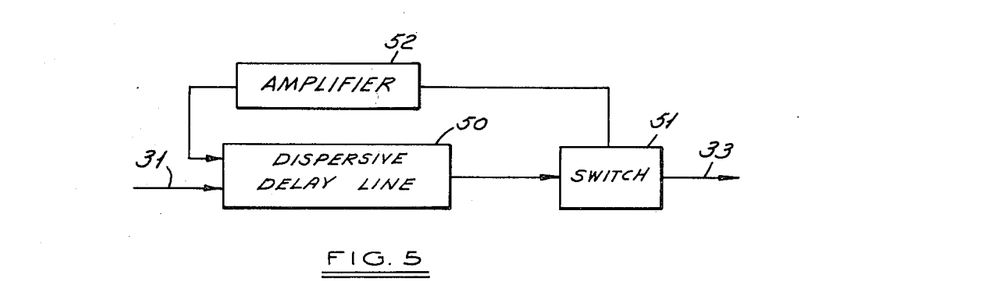
FIG. 5 is a block diagram of an optional dispersive delay system which may be used in the time/bandwidth interchange system depicted in FIG. 1.

In some applications, the number of series delay lines employed may be reduced by using the delay line in a re-entrant mode. Such a re-entrant delay network is depicted in FIG. 5 in which dispersive delay line 50 receives its initial input on line 31 from mixer 30. The output of delay line 50 is fed to switch 51 which loops the response signals back into delay line 50 through amplifier 52 for a predetermined number of passes through the delay line. When this number of passes has been achieved, switch 51 will pass the delayed, offset response signals onto line 33 to mixer 34.

Figure 6:
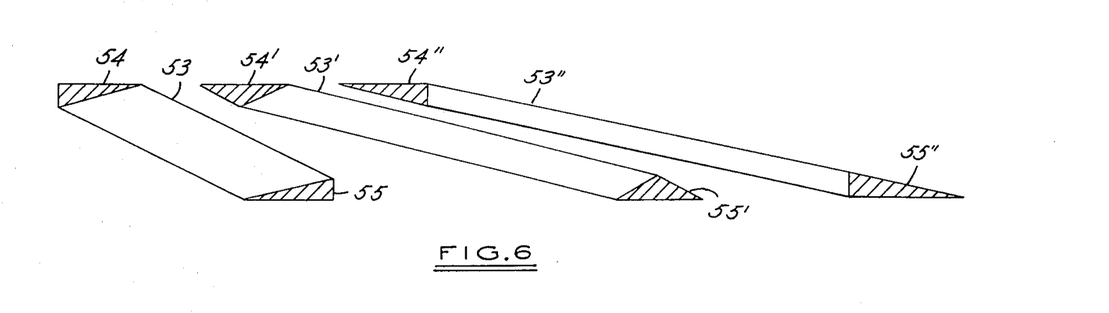
FIG. 6 is a timing diagram depicting the relationships of certain signals appearing in the block diagram of FIG. 5.

FIG. 6 shows a time-frequency history of the various signals in the network of FIG. 5. Parallelogram 53 depicts the time-frequency space occupied by the offset response pulses received from mixer 30 on line 31. Parallelogram 53 therefore corresponds to the response signals shown in FIG. 2C. Parallelograms 53' and 53'' illustrate the time-frequency space occupied by the offset response pulses after first and second passes through delay line 50 respectively. If after two passes through the delay line, response signals from adjacent resolvable targets no longer overlap in time-frequency space, then these delayed, offset response pulses may be switched onto line 33 to mixer 34. In this case, parallelogram 53'' corresponds to the response pulses shown at FIG. 2D.

Also shown in FIG. 6 are first and second hashed areas 54 and 55. Area 54 represents the response signals from targets at ranges just before the beginning of the mapped swath but not removed by time gate 28. These signals require that dispersive delay line 50 be supplemented by a fixed delay at least equal to the input pulse length so that positive feedback does not occur. At least a portion of this fixed delay is inherent in the design of the dispersive delay line; the remainder may be included by appropriate design, as by inclusion of a nondispersive fixed delay in coupling amplifier 52.

Hashed area 55 represents the returns from targets just beyond the end of the swath of interest and not removed by gate 28. These signals impose no additional requirements on the system.

When the swath to be mapped is relatively large, the output of mixer 30 may exceed the bandwidth of available delay lines. This problem may be overcome by reducing the swath to be mapped; but this leads to an increase in the number of swept oscillators required. A more attractive approach is to divide the mapped swath into a series of sub-swaths, each of identical bandwidth, and process the several sub-swaths in separate delay lines. FIG. 7 depicts such a system.

Figures 7, 8, 9:
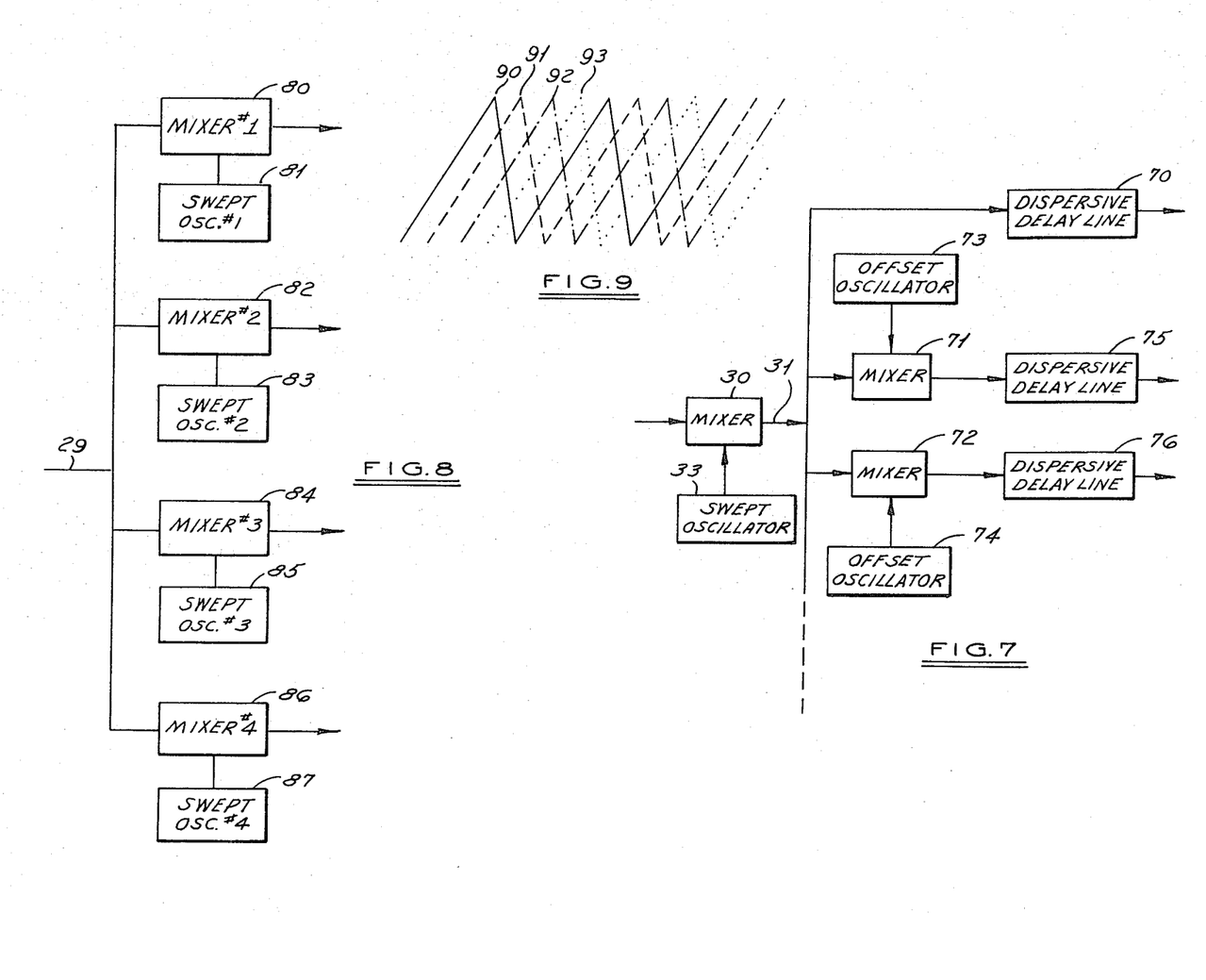
FIG. 7 is a block diagram of an optional dispersive delay system which may be used in the time/bandwidth interchange system of FIG. 1.
FIG. 8 is a block diagram of an optional swept oscillator/mixer system which may be used in the time/bandwidth interchange system of FIG. 1.
FIG. 9 is a timing diagram depicting the relationships of certain signals appearing in the block diagram of FIG. 8.

In FIG. 7, the output of mixer 30 is first connected to dispersive delay line 70 and also to mixers 71 and 72. The second input of mixers 71 and 72 are connected to first and second offset oscillators 73 and 74 respectively. These oscillators are constant frequency oscillators and are for a purpose that will be explained hereafter. The output of mixers 71 and 72 are connected to second and third delay lines 75 and 76 respectively. The output of each delay line is connected to the input of a mixer (not shown), the several separate but identical mixers each being in the nature of mixer 37 of FIG. 1.

In operation, a series of target signals is mixed with the output of swept oscillator 33 in mixer 30 as explained hereinbefore. The resulting series of linearly offset pulses is first fed to delay line 70 which can handle the mixer output in a first bandwidth from $f_0$ to $f_1$. At cut-off frequency $f_1$ delay line 70 becomes inoperative. However, if offset oscillator 73 is oscillating at constant frequency $f_0 + f_1$, then a mixture of its output with the output of mixer 30 as oscillator 33 sweeps from $f_1$ to $f_2$ will produce an input to delay line 75 from frequency $f_0$ to $f_1$, provided that $f_2$ is equal to $f_1$. If offset oscillator 74 is oscillating at frequency $f_0 + f_2$, then delay line 76 will handle target response signals as oscillator 33 sweeps from $f_2$ to $f_3$. Additional offset oscillators, mixers and delay lines may be added to accommodate larger swath length.

It will be noticed that, if the frequency range from $f_0$ to $f_1$, from $f_1$ to $f_2$ and from $f_2$ to $f_3$ are equal, then the delay lines may be identical. Those who practice in the art will recognize this as a significant advance in the area of logistics.

As the requirement for radar bandwidth and mapped swath are extended, the number of series delay lines or delay line re-entries and the frequency excursion of swept oscillator 33 become uncomfortably large. Under these circumstances, it would be desirable to terminate the oscillator sweep at some point and restart it at its initial frequency. However, this would result in a gap in the coverage of the system at least equal to the length of one input chirp pulse. Under these circumstances, the interchange system may include the optional network depicted in FIG. 8 in which a number of oscillator/mixer circuits are sequentially activated during the course of the mapped swath. In FIG. 8, the chirp pulses from gate 28 appearing on line 29 are fed to first, second, third and fourth mixers 80, 82, 84 and 86 respectively. These mixers are also connected to first, second, third and fourth oscillators 81, 83, 85 and 87 respectively. Each mixer will be connected to a dispersive delay line (not shown) in the nature of delay line 32. As was the case with the system of FIG. 7, the output of each of the several delay lines is connected to the input of a mixer (not shown).

Operation of FIG. 8 may best be explained by reference to FIG. 2 and also to FIG. 9 which depicts the outputs of first, second, third and fourth swept oscillators at signals 90, 91, 92 and 93, respectively. It is to be understood that the outputs depicted in FIG. 9 are for the ideal swept oscillators. In practice, the swept oscillators may not have a linear downslope during "flyback time;" furthermore, some transition time may be required before the output may switch its excursion from downslope to upslope. The principle requirement upon the oscillator, as will become evident in the discussion hereinafter, is that the frequency slope be substantially linear during the time the oscillator is used for mixing.

Turning now to FIG. 2, it can be seen that if the mapped swath is to continue beyond response signal 12, then any further response signals will not be fully covered by the output of swept oscillator 33. The second swept oscillator should therefore begin its frequency excursion at time line 15 so that a resolvable target response appearing immediately after response signal 12 will be fully covered by the excursion of the second swept oscillator. It can also be seen in FIG. 2B that the frequency excursion of oscillator 33 continues beyond time line 16. Until oscillator 33 terminates its excursion, returns to its initial frequency, and is ready to begin a new frequency excursion, the various response signals in the extended mapped swath must be picked up by the second and perhaps further swept oscillator/mixer circuits. With this phenomenon in mind, the number of swept oscillator/mixer circuits may be calculated once the length of the swath to be mapped has been determined. Thus, in FIGS. 8 and 9, it has been determined that four oscillator/mixer circuits are required to cover a particular mapped swath.

In FIG. 9, signal 90 is the output of swept oscillator 81. Some time after oscillator 81 begins its frequency excursion, oscillator 83 must be activated in order to fully cover response signals beyond the swath of oscillator 81. In FIG. 9, it can be seen at 90 that oscillator 81 at some time terminates its frequency excursion and returns to its initial frequency. It can also be seen in FIG. 9 that oscillators 83, 85 and 87, having outputs 91, 92 and 93 respectively, adequately cover the target responses that may occur during the swath interval in which oscillator 81 may not do so. Target responses in the overlapping areas may have offset response signals in two of the delay lines attached to the several mixer circuits in FIG. 8. However, the resulting "partially" delayed offset response signals may be adequately handled by the processing equipment after the responses are time-separated by the dispersive lines.

The output of each swept oscillator/mixer circuit will be periodic bursts of target signals. At the input to the dispersive delay line they are time-separated but, because of the dispersive characteristic of the delay line, responses from consecutive bursts may overlap in time at the output of the line; but these signals will still be separated in time-frequency space. The mixing of these signals with the output of the second swept oscillator will produce pure frequency separation which may be easily interpreted by the processing equipment.

The various problem situations outlined above may occur simultaneously in a practical radar application. An illustrative example of the method of combining the various options may facilitate understanding of the present invention.

Assume that a radar is to have a range resolution of one foot (500 MHz bandwidth) and a pulse repitition frequency of 500 Hz (pulse interval of 2,000 $\mu$sec). The swath to be mapped is 10 miles (120 $\mu$sec of radar real time). If it is desirable to reduce the processing bandwidth to 5 MHz, that is a 100:1 reduction, the mapped swath will consume 12,000 $\mu$sec of processing time. Thus, data is gathered by the radar at 2,000 $\mu$sec intervals, but it extends over six times that interval after time/bandwidth interchange. Parallel processing is required, even with "conventional" systems using high speed A/D converters and digital input buffers. The options disclosed hereinabove will automatically provide parallel outputs.

To obtain 5 MHz output bandwidth from the system it is convenient to choose a system input chirp signal duration of 0.2 $\mu$sec. This need not be the transmitted pulse length; see the waveform matching option shown in FIG. 3 and discussed relative thereto.

The first swept oscillator is to sweep at the same rate as the input chirp signal — i.e. 2,500 MHz/$\mu$sec. A linear frequency excursion of 1,000 MHz is reasonable. The duration of the linear sweep is then 0.4 $\mu$sec and the range swath processed is 0.2 $\mu$sec (duration of linear sweep minus length of received signal).

The total bandwidth of the output of the first mixer/oscillator circuit will be about 500 MHz. Since the duration of the input range swath was 0.2 $\mu$sec, and a 100:1 time/bandwidth interchange is required, the signal from the last target processed must be delayed by 20 $\mu$sec (100 × 0.2 $\mu$sec). To meet these requirements the dispersive delay line must have a time/bandwidth product of 10,000 (20 $\mu$sec × 500 Mhz) which is beyond the present state of the art. This problem may be avoided by several techniques.

The most obvious way to reduce the time/bandwidth requirement is to reduce the swath covered by a single swept oscillator. If the range swath were reduced by a factor of two, the bandwidth of the output signal would be reduced to 250 MHz and the differential delay required reduced to 10 $\mu$sec. Hence, the time/bandwidth product would be reduced by a factor of four to 2,500. Four delay lines and swept oscillator/mixer circuits in the configuration shown in FIG. 8 would reduce the time/bandwidth product by 16 to about 625, which is within the present state of the art, and provides for adequate oscillator flyback time.

An alternative approach requiring more economical equipment is to use the configuration shown in FIG. 7 in which the 500 MHz output bandwidth of the swept oscillator/mixer circuit is retained but divided among three delay lines. Each delay line need have only one-third of the required differential time delay so that the time/bandwidth product is again reduced by a factor of nine. In this case the delay lines would be identical and the offset oscillators would arrange the output of the swept oscillator/mixer circuit to conform to the band pass characteristics of the delay lines.

Assuming this multiple delay line approach is used, the swept oscillator linear FM duration is 0.4 $\mu$sec to cover a range swath of 0.2 $\mu$sec; a second swept oscillator is therefore required to cover the next 0.2 $\mu$sec range. However, real swept oscillators tend to have a flyback time greater than zero; it is therefore desirable to use three swept oscillator/mixer circuits.

The use of multiple oscillator/mixer circuits results in overlapping outputs. The use of multiple delay lines with each oscillator/mixer also produces overlapping, nearly parallel, narrow band output signals from each mixer channel. The combination of three swept oscillator/mixers each with three parallel delay lines, leads to nine parallel output channels as contrasted with the six parallel channels required merely to meet the time/bandwidth v. radar pulse repitition frequency requirements discussed at the beginning of this illustrative example.

Thus, it is apparent that there has been provided in accordance with the invention a time/bandwidth system that fully satisfies the objects and advantages set forth above. While the invention has been described in conjunction with a pulsed radar system, it is evident that it is equally applicable to other pulsed sensor systems such as sonar and seismic or optical sensor systems. Furthermore, it will be recognized that, while the invention is described in conjunction with digital processing equipment, it is equally applicable to pulsed sensor systems using analog processing systems.

It is evident that many alternative, modifications and variations will be apparent to those skilled in the art in light of the foregoing description. Accordingly, the invention is intended to embrace all such alternatives, modifications and variations as fall within the spirit and broadscope of the appended claims.

What is claimed is:

1. In a pulsed sensor system wherein the target return signals consist of a series of chirp pulses extending over the time interval corresponding to the target swath to be mapped, the method of time/bandwidth interchange comprising the steps of:
   providing a constant-frequency pulse in response to each of said chirp pulses,
   offsetting each of said constant-frequency pulses in frequency linearly with range,
   delaying each of said offset constant-frequency pulses as a function of frequency, such that pulses from adjacent resolvable targets do not overlap in time, and
   rechirping said delayed, offset constant-frequency pulses into narrow-band chirp signals.

2. In the method of time/bandwidth interchange wherein wide-band frequency modulated pulses are converted to constant-frequency pulses each linearly offset in frequency in proportion to the time between wide-band pulses, the improvement comprising the steps of delaying each of said offset, constant-frequency pulses as a function of frequency such that succeeding delayed, offset constant-frequency pulses do not overlap in time, and mixing each of said delayed, offset constant-frequency pulses with a signal having a rate of frequency variation equal to the rate of change of said frequency function.

3. The combination with a source of wide-band pulsed signals having a predetermined rate of frequency modulation of a system comprising:
   means to provide a constant-frequency pulse in response to each of said pulsed signals and to offset each succeeding constant-frequency pulse from the former linearly in frequency by an amount proportional to the time between the pulsed signals, and
   means operatively connected to said last named means to delay said offset constant-frequency pulses as a function of frequency such that succeeding delayed, offset, constant-frequency pulses do not overlap in time.

4. The combination set forth in claim 3 further comprising means operatively connected to said delay means to provide narrow-band pulsed signals from said delayed, offset, constant-frequency pulses.

5. The combination set forth in claim 4 wherein said narrow-band pulses providing means comprises second oscillator means having a rate of frequency variation equal to the rate of change of the frequency function of said delay means, and second mixer means to mix the output of said second oscillator means with said delayed, offset constant-frequency pulses.

6. The combination set forth in claim 3 wherein said constant-frequency pulse providing means comprises oscillator means having a rate of frequency variation equal to said predetermined rate of frequency modulation, and mixer means to mix the output of said oscillator means with said wide-band pulsed signals, thereby providing said offset constant-frequency pulses.

7. In a pulsed sensor system including transmitter means for generating a chirp output pulse of a predetermined length and slope and receiver means for receiving a number of target response chirp pulses for each transmitted pulse, the time between said transmitted pulse and said target response pulses being proportional to the range of the targets, a time/bandwidth interchange system which reduces the frequency bandwidth of said target response pulses by time-expansion of the information contained therein, said time/bandwidth interchange system comprising, in combination:
   input means operatively connected to said receiver means,
   first mixer means operatively connected to said input means to provide constant-frequency response pulses from said target response pulses, each of said constant-frequency response pulses being offset in frequency linearly with range,
   dispersive delay means operatively connected to said first mixer means to delay said offset, constant-frequency response pulses as a function of frequency such that delayed, offset, constant-frequency response pulses from adjacent resolvable targets do not overlap in time, and
   second mixer means operatively connected to said dispersive delay means to provide narrow-band chirp pulses from said delayed, offset, constant-frequency response pulses.

8. The time/bandwidth interchange system set forth in claim 7 wherein said first mixer means comprises a first swept oscillator whose output frequency varies at a rate equal to said predetermined slope during the time associated with the range of the target swath to be mapped and a first mixer circuit to mix the output of said first swept oscillator with said amplified target response chirp pulses, and wherein said second mixer means comprises a second swept oscillator whose output frequency varies at a rate equal to the rate of change of the frequency function of said delay means and a second mixer circuit to mix said delayed, offset, constant-frequency response pulses with the output of said second swept oscillator.

9. The time/bandwidth interchange system set forth in claim 7 wherein said input means includes gate circuit means to gate target response pulses to said first mixer means only during the time associated with the target swath to be mapped.

10. The time/bandwidth interchange system set forth in claim 7 wherein said input means includes dispersive delay means to stretch said target response chirp pulses in time linearly with frequency.

11. The time/bandwidth interchange system as set forth in claim 7 wherein said dispersive delay means includes delay line means having a delay that is a function of frequency, the input of said delay line means being connected to receive said offset constant-frequency response pulses, means coupling the output of said delay line means to the input thereof, thereby causing said pulses to be repeatedly passed through said delay line means, and means extracting said pulses after a predetermined number of passes through said delay line means.

12. The time/bandwidth interchange system as set forth in claim 11 wherein said coupling means includes non-dispersive, fixed delay means.

13. The time/bandwidth interchange system set forth in claim 7 wherein said dispersive delay means includes:

a first number of dispersive delay lines, and a second number of oscillator/mixer circuits each electrically disposed between said first mixer means and one of said delay lines, whereby the output of said first mixer means is divided among said dispersive delay lines by said oscillator/mixer circuits sequentially according to the frequency of said output.

14. The time/bandwidth interchange system set forth in claim 13 wherein said second number is one less than said first number.

15. The time/bandwidth interchange system set forth in claim 13 wherein each of said oscillator/mixer circuits includes a constant-frequency oscillator.

16. The time/bandwidth interchange system set forth in claim 7 wherein said first mixer means comprises a number of oscillator/mixer circuits which are sequentially activated during the course of the mapped swath, each of said circuits being activated at least one time, and wherein said dispersive delay means comprises a number of dispersive delay lines equal to said number of oscillator/mixer circuits each of which delay lines is electrically disposed between a corresponding oscillator/mixer circuit and said second mixer means.

17. The time/bandwidth interchange system set forth in claim 16 wherein said second mixer means comprises a number of second mixer/oscillator circuits equal in number to said number of dispersive delay lines, each of said second mixer/oscillator circuits being disposed to provide narrow-band chirp pulses from the output of one of said delay lines.

18. The time/bandwidth interchange system set forth in claim 7 wherein said dispersive delay means includes a plurality of dispersive delay lines connected in series between said first and second mixer means.

19. The time/bandwidth interchange system set forth in claim 18 wherein said dispersive delay means further includes amplification means electrically inserted between each of said plurality of dispersive delay lines.

* * * * *